United States Patent [19]
Chun et al.

[11] Patent Number: 5,309,537
[45] Date of Patent: May 3, 1994

[54] OPTOELECTRONIC COUPLING DEVICE AND METHOD OF MAKING

[75] Inventors: Christopher K. Y. Chun, Mesa; Davis H. Hartman, Phoenix; Shun-Meen Kuo, Chandler; Michael S. Lebby, Apache Junction, all of Ariz.

[73] Assignee: Motorola, Inc., Schaumburg, Ill.

[21] Appl. No.: 43,944

[22] Filed: Apr. 5, 1993

[51] Int. Cl.⁵ ............................................. G02B 6/42
[52] U.S. Cl. .............................. 385/59; 385/71; 385/126; 385/89
[58] Field of Search ............. 385/59, 71, 88–94, 385/126

[56] References Cited
U.S. PATENT DOCUMENTS

| | | | |
|---|---|---|---|
| 4,217,030 | 8/1980 | Howarth | 385/59 X |
| 4,597,631 | 7/1986 | Flores | 385/59 X |

Primary Examiner—John D. Lee
Assistant Examiner—Phan Thi Heartney
Attorney, Agent, or Firm—Gary F. Witting; Eugene A. Parsons

[57] ABSTRACT

An optical electronic coupling device (100) including a molded waveguide (101, 301, 401) having a plurality of core regions (105) surrounded by a cladding region (103). Cross-sections of the core regions (105) are exposed in an opening (113, 213, 313) at one end of the waveguide. An optical cable (102, 303) having a plurality of optical fibers (107, 108, 109, 300) with core regions (123, 124, 125) is inserted into the opening (113, 213, 313), thereby aligning the core regions (123, 124, 125) of the optical fibers (107, 108, 109, 300) with the exposed cross-sections (122) of the core regions (105) of the optical electronic device (100).

19 Claims, 5 Drawing Sheets

OPTOELECTRONIC COUPLING DEVICE AND METHOD OF MAKING

BACKGROUND OF THE INVENTION

This invention relates, generally, to optics, and more particularly, to coupling of optical fibers to a waveguide.

At present, an optical fiber or optical fibers are coupled to optoelectronic devices by a multistep process. First, an end of the optical fiber is aligned or positioned to an end of a core region of a waveguide. Second, once the end of the optical fiber is aligned to the core region of the waveguide, the end of the optical fiber is affixed to the core region of the waveguide, thus permanently fixing the optical fiber to the core region of the waveguide.

Generally, the alignment of the end of the optical fiber to the core region is accomplished by either an active or a passive alignment procedure. The active alignment procedure requires that a light signal be passed through the optical fiber and the core region of the waveguide, as well as having the light signal being detectable when the optical fiber and the core region are aligned. Once the optical fiber and the core region are aligned, the optical fiber is held and cemented or affixed in place. However, active alignment has several disadvantages, such as being labor intensive, being slow, and having a high cost, thus making active alignment an unattractive approach in a high volume manufacturing environment.

Alternatively, the passive alignment procedure aligns the optical fiber to the core region by mechanically placing the optical fiber to the core region of the waveguide. However, as passive alignment is presently practiced, passive alignment has several disadvantages such as poor alignment quality that results in poor quality of product as a whole or a product that is defective and cannot be sold, thus resulting in the product having a high cost. Further, passive alignment requires that machining tools and alignment tools have extremely high alignment and positioning tolerances and accuracies, thus further increasing the cost and difficulty of manufacture in a high volume manufacturing environment.

By now it should be apparent, that the presently used coupling methods for connecting optical fibers to waveguides have several problems that severely limit their use in a production environment. Further, it should be pointed out that alignment of optical fibers to waveguides typically is achieved by aligning the optical fibers to the core region by hand, thus incurring a high cost in manufacturing of coupling optical waveguides to optical fibers. Thus, a method for connecting optical fibers to waveguides that is cost effective and manufacturable in a high volume environment would be highly desirable.

SUMMARY OF THE INVENTION

Briefly stated, an optical electronic coupling device is provided. A molded waveguide having a plurality of core regions surrounded by a cladding region is formed. The molded waveguide formed has a first and a second end. The first end includes an opening that exposes at least one core region of the plurality of core regions of the molded waveguide. An optical cable having a first and a second end with the first end of the optical cable having a plurality of individual optical fibers each of which includes a core region is connected to the first end of the molded waveguide by inserting into the opening aligning the core region of at least one of the individual fibers to at least one core region of the plurality of core regions of the waveguide.

DETAILED DESCRIPTION OF THE DRAWINGS

Figure 1:
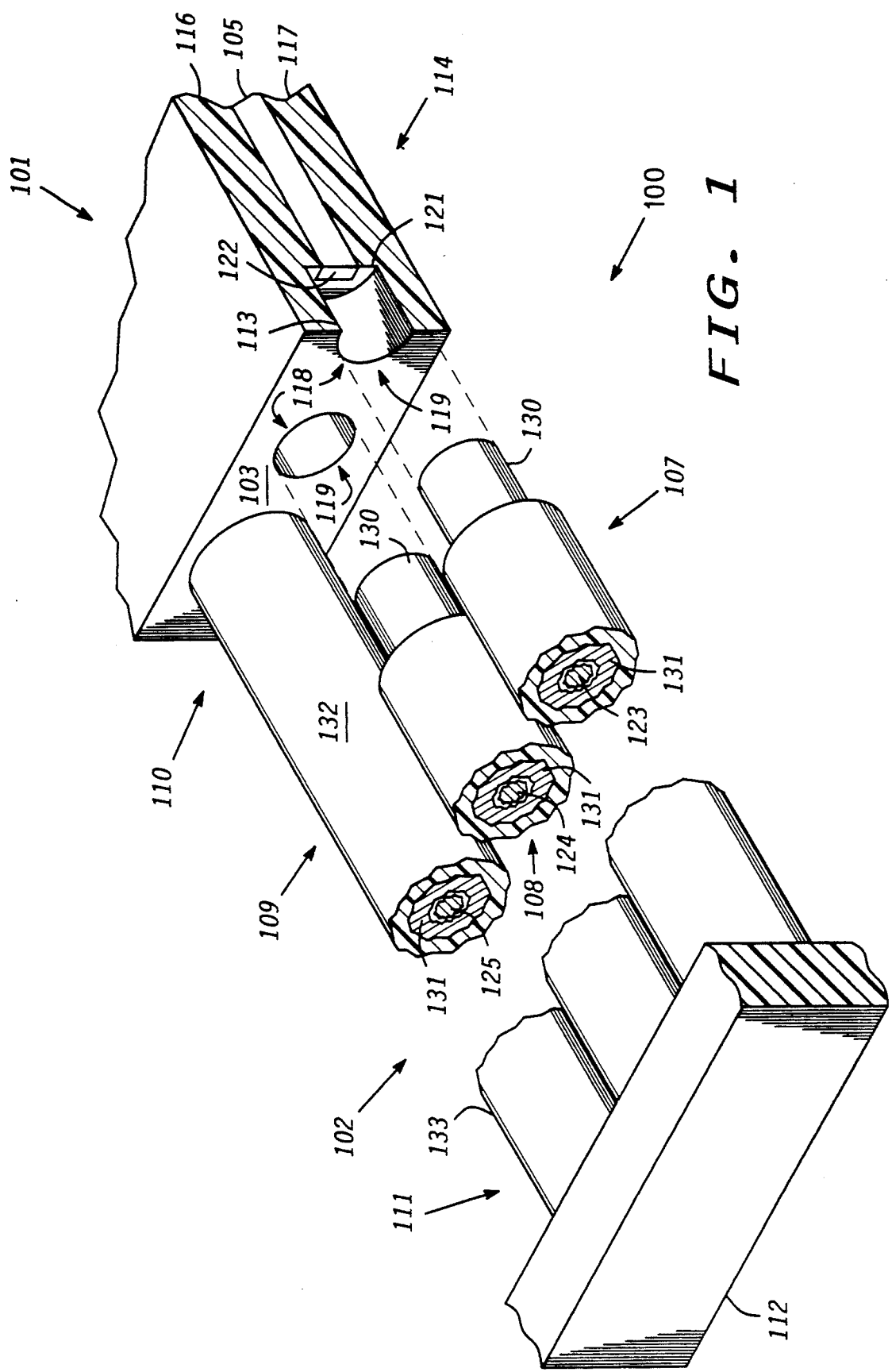
FIG. 1 is a highly enlarged simplified exploded perspective view of an optical cable with individual optical fibers joining a molded waveguide, portions thereof broken away.

FIG. 1 is a highly enlarged simplified perspective view of a portion of an optoelectronic coupling device 100. In this highly enlarged simplified perspective view, a portion of a waveguide 101 and a portion of an optical cable 102 are illustrated. Generally, waveguide 101 is made by molding in accordance to the teachings of two co-pending patent applications titled MOLDED WAVEGUIDE AND METHOD OF MAKING SAME, with Ser. No. 07/889,335, filed May 28, 1992, and titled MOLDED WAVEGUIDE WITH A UNITARY CLADDING REGION AND METHOD OF MAKING, with Ser. No. 8/019731 and still pending, filed Feb. 19, 1993, both co-pending applications having the same assignee.

Generally, a core region 105 and an associated alignment guide 113 illustrate one of a plurality of core regions (not shown) and one of a plurality of alignment guides 114 that are embedded in waveguide 101. Typically, waveguide 101 is made of a hard optically transparent polymer. Alignment guide 113 is made as an opening or a cavity with a blind end, such as a cylindrical cavity, a flared cavity, or a channel. The blind end forms a bottom surface 121 that exposes a cross sectional surface 122 of core region 105. Also, cladding region 103 that surrounds core region 105 is made of a hard optically transparent polymer, however, additives such as silicates and silicones may be added to improve structural characteristics of cladding region 103. Additionally, core region 105 has a higher refractive index than does cladding region 103, thus allowing for efficient light transmission through core region 105. More specifically, there is a refractive index difference of at least 0.01 between core region 105 and cladding region 103. Further, it should be understood that waveguide 101 is capable of being manufactured by at least two alternative methods.

First, cladding region 103 is manufactured by molding two separate pieces which contain grooves or channels that correspond to core region 105. Subsequently, the two separate cladding regions or optical portions 116 and 117 are adhered together with an optical adhesive that fills the grooves or channels and makes core region 105. This method is described in more detail in the above described co-pending patent application entitled "MOLDED WAVEGUIDE AND METHOD OF MAKING SAME". Second, core region 105 is molded as a stand alone feature with a subsequent molding of cladding region 103 around core region 105. This method is described in more detail in the above described co-pending patent application entitled "MOLDED WAVEGUIDE WITH A UNITARY CLADDING REGION AND METHOD FOR MAKING".

Optical cable 102 is a standard optical cable having a plurality of optical fibers of which three are illustrated 107, 108, and 109 having core regions 123, 124, and 125, respectively. Generally, core regions 123, 124, and 125 are covered or surrounded by a cladding layer 131. Further, cladding layer 131 is covered by a protective layer 132, thereby protecting optical fibers 107, 108, and 109. Moreover, optical fibers 107, 108, and 109 are bound by a covering 133 that further protects the plurality of optical fibers. Additionally, it should be understood that optical cable 102 has a first end 110 and a second end 111, wherein first end 110 has optical fibers 107, 108, and 109 separated and wherein second end 111 has optical fibers 107, 108, and 109 connected together and inputted into an optical connector 112. Optical fibers 107, 108, and 109 are further illustrated with a portion of protective layer 132 removed at first end 110 to provide a prepared optical fiber end 130 for each optical fiber.

In the present invention, a plurality of openings or a plurality of alignment guides 114 are fabricated in waveguide 101, thus allowing accurate and precise insertion of end 130 of optical fibers 107, 108, and 109 of first end 110 of optical cable 102 into the plurality of alignment guides 114 of waveguide 101. Generally, the plurality of openings or the plurality of alignment guides 114 are shaped similarly to ends 130 of optical fibers 107, 108, and 109, thus allowing a compatibility of structures between optical fibers 107, 108, and 109 and the plurality of openings 114. The plurality of alignment guides 114 are fabricated by any suitable means, such as molding, milling, laser ablating, or the like.

In a preferred embodiment of the present invention illustrated in FIG. 1, the plurality of alignment guides 114 are made by molding. For example, during fabrication of cladding region 103, wherein cladding region 103 is molded with optical portion 116 and optical portion 117, the plurality of alignment guides 114 also are molded with a first alignment portion 118 and a second alignment portion 119 which are molded simultaneously with optical portion 116 and optical portion 117, thus making two halves of the plurality of alignment guides 114 that are affixed together to form waveguide 101. Coupling of the core regions, 105 and others, of waveguide 101 to optical fibers 107, 108, and 109 is achieved by any of several methods.

For example, if waveguide 101 having alignment guides 114 is made separately, for example by the second method described above, insertion of ends 130 of optical fibers 107, 108, and 109 into the plurality of alignment guides is accomplished as a separate process. However, if waveguide 101 having alignment guides 114 is made with optical portion 116, 117, as described in the first method above, insertion of end 130 of optical fibers 107, 108, and 109 is capable of being achieved simultaneously with forming of core 105, thus simultaneously affixing optical fibers 107, 108, and 109 in the plurality of alignment guides 114 and facilitating manufacture of waveguide 101.

Typically, when waveguide 101 is made separately, optical portion 116 and first alignment portion 118 is joined to optical portion 117 with second alignment portion 119 by applying an optical adhesive between the first optical portion 116 and the second optical portion 117 and pressing the two optical portions 116, 117, together. Additionally, sizing of each of the plurality of alignment guides 114 is achieved such that insertion of ends 130 of optical fibers 107, 108, and 109 is capable of being achieved while maintaining alignment of core regions 123, 124, and 125 to their respective core regions of waveguide 101. Typically, sizing of the plurality of alignment guides is achieved by having the plurality of alignment guides range from 0.1 micron to 10.0 microns larger then optical fiber ends 130. However, a cleaning or a milling procedure is sometimes necessary to further prepare bottom surface 121 that exposes cross-section 122 of core region 105, thus enabling core 123 of optical fiber 107 to be aligned to core region 105 of waveguide 101. Once the plurality of alignment guides 114 are cleaned and prepared, an optically transparent cement or adhesive is applied so as to affix ends 130 of optical fibers 107, 108, and 109 to waveguide 101, thus aligning core regions 123, 124, and 125 of optical fibers 107, 108, and 109 to their respective core regions in waveguide 101. Utilizing the plurality of alignment guides 114 to affix, as well as to align core regions 123, 124, and 125 to their respective core regions results in a positive alignment of optical fiber 107, 108, and 109 to the plurality of core regions of waveguide 101. Further, insertion and affixing of ends 130 of optical fibers 107, 108, and 109 into waveguide 101 stabilizes the delicate optical fibers so as to lessen an opportunity for the optical fiber to break or to crack.

Alternatively, optical fibers 107, 108 and 109 are affixed simultaneously as core region 105 is fabricated. For example, optical portion 117 is staged for assembly with optical portion 116, thereby exposing second alignment portions 119 of the plurality of alignment guides 114. Ends 130 of optical fibers 107, 108, and 109 (end 130 of optical fiber 109 is inserted into waveguide 101) are inserted and abutted against a partial surface 121 of second optical portion 117. Optical fibers 107, 108, and 109 are then held in place while an optical adhesive is applied to optical portion 117. Once the optical adhesive is applied to optical portion 117, optical portion 116 is aligned and pressed into place so as to form core 105, etc. and simultaneously adhere optical fibers 107, 108, and 109 to both optical portion 116 and optical portion 117, thus simultaneously aligning and adhering optical fibers 107, 108, and 109 to the plurality of core regions embedded in waveguide 101.

Figure 2:
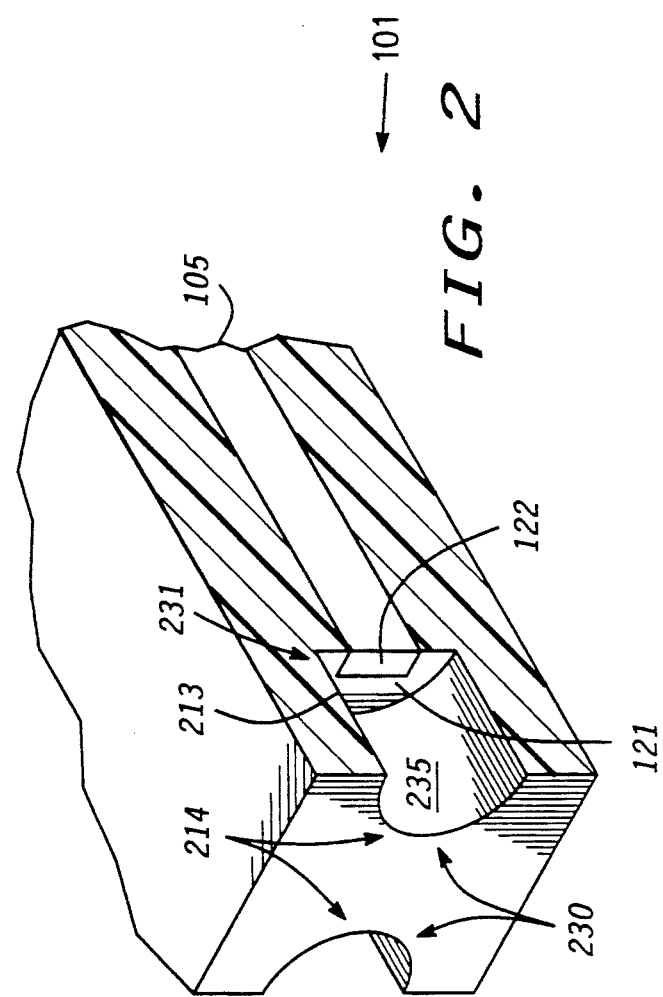
FIG. 2 is a highly enlarged simplified cross sectional perspective view of a molded waveguide illustrating a configuration of an alignment guide.

FIG. 2 is a highly enlarged simplified cross sectional perspective view of a portion of waveguide 101 illustrating a physical configuration of an alignment guide 213. In this simplistic illustration, only a portion of waveguide 101 is illustrated. It should be understood that while only a single alignment guide 213 is cross-sectionally illustrated, a plurality of alignment guides 214 (two being illustrated) are capable of being formed in waveguide 101.

Waveguide 101 is fabricated as previously discussed hereinabove in FIG. 1. However, in this illustration of the present invention, alignment guide 213 is formed as a flared cavity in waveguide 101. The flared cavity is shaped as a cone with an end portion 230 having a wide circular shape and another end portion 231 that terminates in bottom surface 121 that exposes at least a portion of core region 105. In this embodiment of the present invention, alignment guide 213 is configured with a wide opening at end portion 230 that narrows or converges to end portion 231 that terminates in bottom surface 121, thus enhancing alignment and placing of an optical fiber (not shown). Further, by using a flared configuration of alignment guided 213 automated placing of the optical fiber in alignment guide 213 is enhanced. Moreover, in the present invention, alignment of the optical fiber and an optic core (not shown), which is contained in the optical fiber, to core region 105 is ensured of precise alignment by having a large continuously narrowing surface 235 of alignment guide 213, thus guiding the optical fiber and the optical core to core region 105 of waveguide 101.

As previously described in FIG. 1, it should be understood that bottom surface 121 includes cross-sectional surface 122 of core region 105 which sometimes requires additional cleaning or polishing, as described hereinabove, to provide a clean optical surface to cross-sectional surface 231 of core region 105, as well as surrounding areas.

By way of example only, circularly shaped end portion 230 of waveguide 101 provides a large target for insertion of an optical fiber (not shown). Typically, with core region 105 having a center to center spacing of 250 microns, diameters of circularly shaped end portions 230 are capable of being extended until each end portion 230 touch, i.e., end portions 230 are capable of having a diameter range from 250 microns or less, thereby providing the largest possible target for alignment of the optical fiber. A positive alignment of the optical fiber to core region 105 is provided by using physical surface constraints of alignment guide 213 to ensure the alignment of the optical fiber to core region 105 of waveguide 101.

Figure 3:
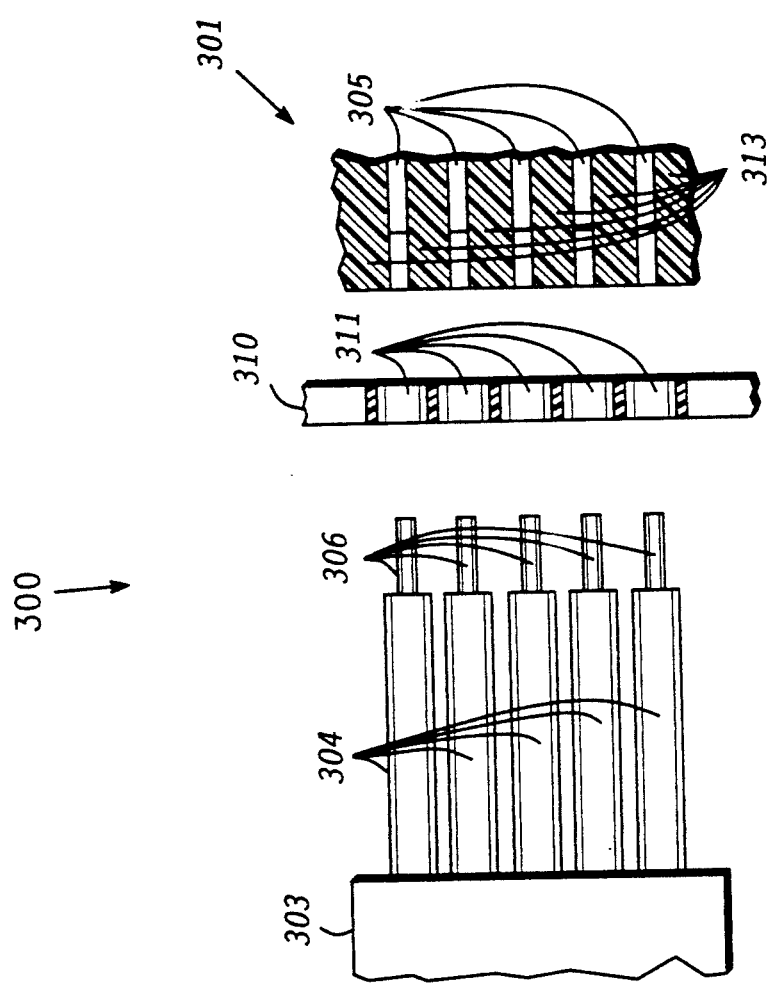
FIG. 3 is a simplified enlarged schematic illustration of an assembly method for insertion of optical fibers in the molded waveguide.

FIG. 3 is a greatly simplified schematic illustration of an assembly method for insertion of optical fibers 300 into a waveguide 301. Generally, a multifiber ribbon 303 is prepared prior to assembly of multifiber ribbon 303 with waveguide 301 by stripping off a portion of an outer protective layer or an outer tape layer, thus exposing individual optical fibers 300. Typically, the stripping off of the outer protective layer is accomplished by any suitable method, such as physically stripping the outer layer, chemically striping the outer protective layer, or the like. Once the outer protective layer is stripped and optical fibers 300 are exposed, optical fibers 300 need to be further prepared prior to insertion in waveguide 301.

Generally, optical fibers 300 are manufactured with a coating 304 that further protects a core region (not visible) that is encased in a cladding region 306. A portion of coating 304 is remove by any suitable method, such as physically stripping, chemically stripping, or the like. A preferable method for stripping coating 304 from cladding layer 306 is dipping optical fiber 300 in a chemical solvent, such as methylene chloride, or the like, thus exposing cladding layer 306 of optical fiber 300. With multifiber ribbon 303 having optical fibers 300 prepared, subsequent alignment and insertion of the prepared optical fiber into waveguide 301 is performed as follows.

Alignment device 310 is sometimes used for coarse alignment of optical fibers 300 to waveguide 301. As illustrated in FIG. 3, alignment device 310 is shown as a top view with alignment device 310 cross-sectioned. Generally, alignment device 310 is a structural device with openings 311 that allows cladding regions 306 and coating 304 of optical fibers 300 to pass through openings 311, thereby coarse aligning the core regions that are encased by cladding regions 306 to waveguide 301. Further, it should be understood that openings 311 are capable of being modified by shaping openings 311, i.e., having openings 311 beveled or flared. Having openings 311 beveled or flared, allows optical fibers 300 that are slightly missaligned to be corrected or brought in coarse alignment by alignment device 310. Additionally, it should be understood that alignment device 310 is capable of being used to align optical fibers 300 to waveguide 301 and subsequently removed when coarse alignment is no longer necessary. Typically, alignment device 310 is part of an automated system, thus allowing alignment device 310 to be mechanically moved away when cladding regions 306 are inserted into alignment guides 313 or in close proximity to alignment guides 313.

As shown in FIG. 3, waveguide 301 is made with alignment guides 313 being flared, thus providing a positive alignment of the core region that is encased in cladding region 306 to core region 305 of waveguide 301.

Generally, prepared fiber ribbon 303 is passed through alignment device 310, thus coarse aligning cladding layer 306 to alignment guides 313 of waveguide 301. Alignment guides 313 and cladding region 306 are then brought and pressed together, thereby allowing alignment guides 313 to direct cladding layer 306 to core region 305 as cladding layer 306 moves toward core region 305. Subsequently, when cladding layer 306 and core region 305 meet, cladding regions 306 are held in position and affixed in place, thus securing waveguide 301 to fiber ribbon 303.

Figure 4:
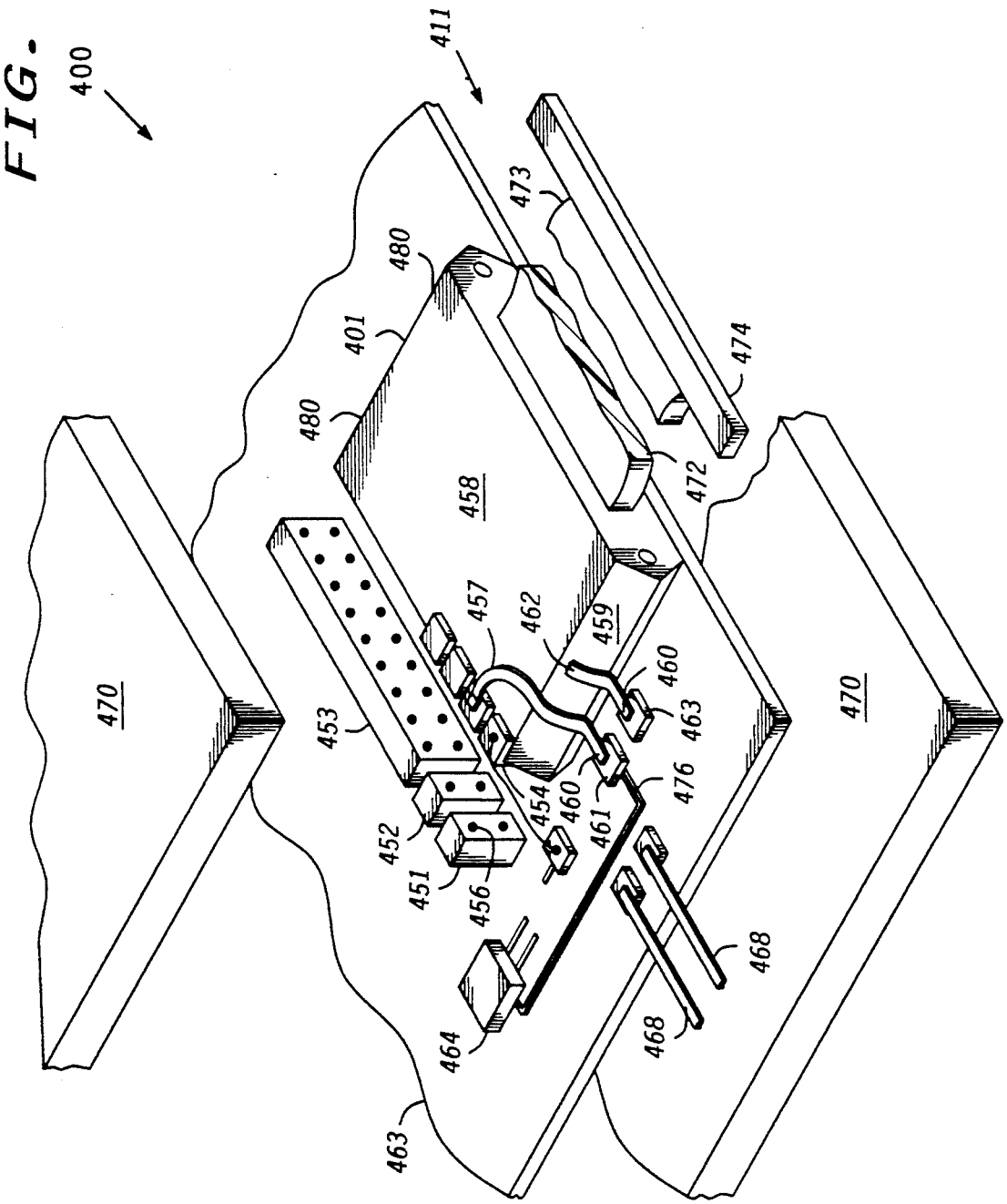
FIG. 4 is a highly enlarged partially exploded view of an optoelectronic module.

FIG. 4 is a simplified partially exploded pictorial view of an optoelectronic module 400. In the present invention, a molded optical waveguide 401 having ends 480 is made by any suitable method as described herein above.

Typically, waveguide 401 is fitted with optical components such as a photo transmitter or laser 451, a photo detector or photodiode 452, or a combination of both lasers and diodes. Alternatively, an array 453, which contains a variety of optical components is capable of being mounted on waveguide 401. In a preferred embodiment of the present invention, the photo transmitter and the photo detector are a vertical cavity surface emitting laser (VCSEL) and a p-i-n photodiode, respectively. The optical components are mounted to molded optical waveguide 401 in such a manner that individual working portions of the optical components are aligned to an individual core region, as shown in FIGS. 1 and 2, thus providing maximum light transmission or reception through individual core regions.

By way of example, laser 451 is mounted to a tab 454 and another tab (not shown), thus providing an electrical and mechanical connection, illustrated by dots 456. Typically, the electrical and mechanical connection illustrated by dots 456 are achieved by any suitable method, such as conductive adhesives, solder bumps, gold bumps, or the like. By accurately placing laser 451 to molded optical waveguide 401 and making suitable electrical mechanical connections, light transmission from a working portion (not shown) of laser 451 is guided through molded optical waveguide 401. Further, it should be understood that optical components, such as photo diode 452 and array 453, are mounted to optical molded waveguide 401 and electrically mechanically connected to molded optical waveguide 401 in a manner that is similar to the described example presented herein above. Moreover, it should be understood that tab 454 can be modified to any suitable configuration, thus allowing electrical connection to the optical components and mounting of waveguide 401 by several methods.

A tab 457 provides an electrically conductive path that traverses surface 458 and extends downwardly along side 459 to form a foot 460 that electrically and mechanically attaches to a bonding pad 461. Alternatively, electrical connections can be incorporated or embedded into waveguide 401, thus producing a conductive lead 462 that extends out of side 459 and downwardly to form a foot 460 that electrically and mechanically attaches to a bonding pad 463.

Generally, molded optical waveguide 401 with attached optical components is attached to a substrate or an interconnect board 463. Several methods may be used for attaching interconnect board 463 to molded optical waveguide 401, such as adhering, press fitting, molding or the like. However, in a preferred embodiment of the present invention, an epoxy adhesive is applied to interconnect board 463 at an approximate location where the molded optical waveguide 401 and the interconnect board 463 are to be bonded. Waveguide 401 is placed into the adhesive by an automatic system such as a robot arm (not shown), thereby providing accurate placement and orientation of waveguide 401 in relation to interconnect board 463. In addition standard electrical components, illustrated by integrated circuit 464 are capable of being mounted to interconnect board 463, thus incorporating data processing capability into optoelectronic module 400. Typically interconnection between standard electrical components and optical components is achieved by any suitable means, such as wire bond 466, a conductive path 476 between integrated circuit 464, pad 461, or the like. It should be evident by one skilled in the art, that many more electrical couplings typically are necessary to fully utilize inputs and outputs of both the standard electrical components and the optical components. It should be further evident that standard output and input means represented by leads 468, are used to couple other components (optical or electrical) as well.

Further, plastic encapsulation of integrated circuit board 463 typically is achieved by an overmolding process, represented by plastic pieces 470, which encapsulates interconnect board 463, molded waveguide 403, and the optical components. Additionally, overmolding allows first end 472 of optical cable 471 to be firmly affixed to waveguide 401 while second end 473 of optical cable 471, as well as optical connector 474, are free so as to be able to be interconnected to another module.

Figure 5:
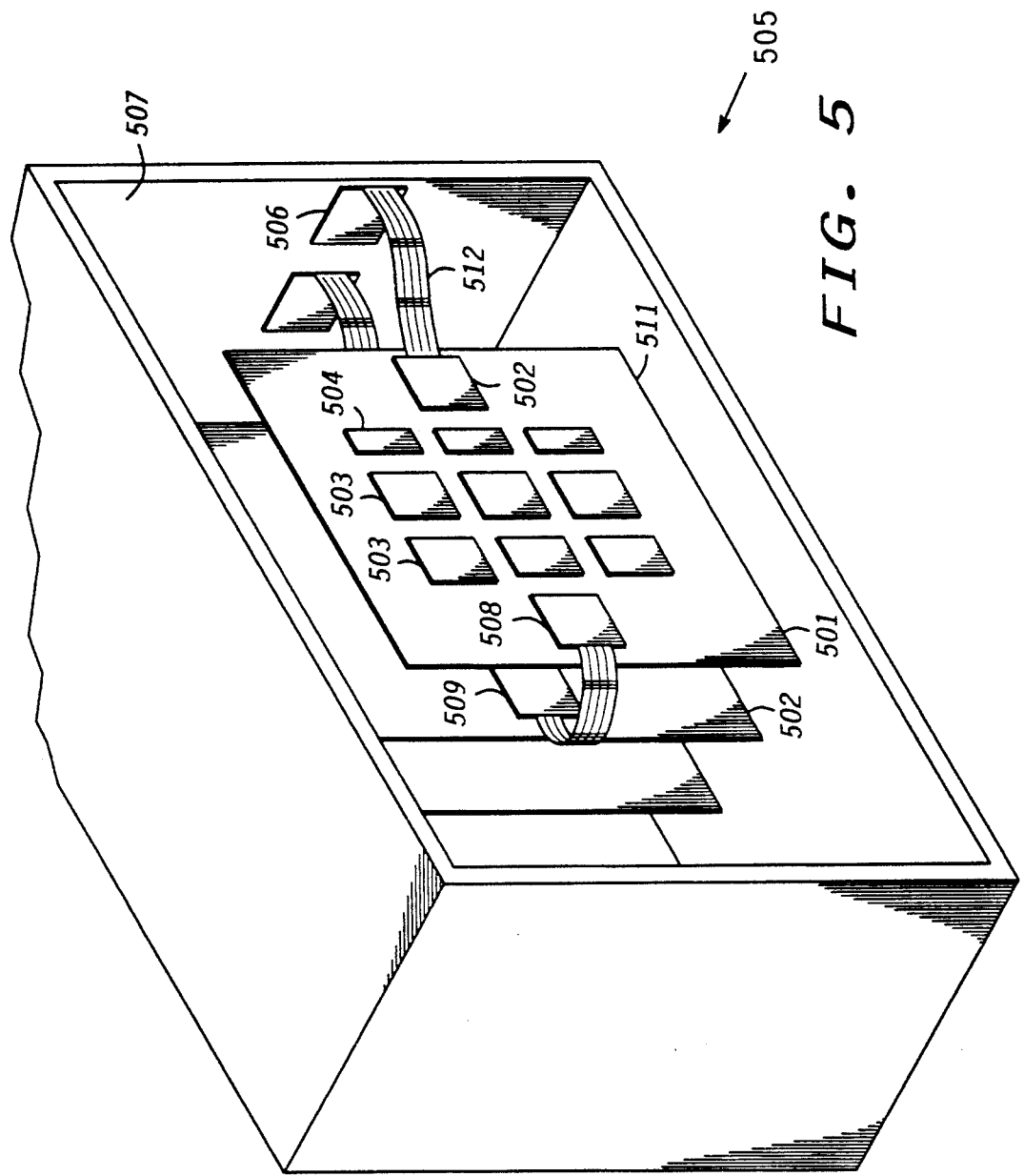
FIG. 5 is a pictorial illustration of a plurality of PC boards utilizing optoelectronic modules.

FIG. 5 is a pictorial illustration of a plurality of printed circuit boards (PCB) 501 utilizing optoelectronic modules 502, 508, and 509. As illustrated in FIG. 5, PCBs are contained in a box 505. Typically, box 505 is a portion of a piece of equipment that utilizes PCBs, such as a computer, computer controlled machine, or the like. Sidewall 507 typically is a wall that separates an inside area of box 505 and an outside environment. It should be understood that the pictorial illustration of FIG. 5 has been greatly simplified, thus omitting many details in an effort to more clearly describe the present invention.

Generally, optoelectronic modules 502, 508, and 509 are previously fabricated as described hereinabove. Typically, PCBs 501 have a variety of electronic components, such as integrated circuits 503 and individual components 504 such as capacitors, resistors, or the like. Additionally, these components are interconnected by conductive pathways (not shown) that interconnect all of the components together.

In the present invention, optoelectronic module 502 with associated optical cable 512 and connector 506 input and output optical signals through wall 507 by connector 506, thus enabling optical signals to enter and to leave PCB 511 from an outside environment. By providing for the input and output of optical signals utilizing the present invention, information contained in the optical signals is distributed and processed to standard electronic components 503 and 504 much more rapidly then by using conventional metal wire alternatives.

Further, in the present invention, optical signals are passed between PCB 511 and 512 by utilizing optical modules 508 and 509, thus maximizing the speed of transferring optical data from PCB 511 to PCB 512.

By now it should be appreciated that a novel method for making an optoelectronic device and using that optoelectronic device has been described. The method for making the optoelectronic device provides a positive alignment system for optical fibers while maintaining an effective and efficient manufacturing process that is cost effective with high quality. Additionally this method allows for high speed optical communication, thus maximizing speed capabilities of standard electronic components.

What we claim:

1. An optoelectronic coupling device comprising:
    a molded waveguide having a plurality of core regions surrounded by a cladding region, the molded waveguide having a first end and a second end, the first end of the molded waveguide having an opening that exposes at least one core region of the plurality of core regions of the molded waveguide; and
    an optical cable having a first end and a second end with the first end of the optical cable having a plurality of individual optical fibers each of which includes a core region, the individual optical fibers connected to the first end of the molded waveguide such that the core region of at least one of the individual fibers is inserted into the opening of the first end and aligned to the at least one core region of the plurality of core regions of the waveguide.

2. An optoelectronic coupling device as claimed in claim 1 further including the second end of the optical cable being an optical connector.

3. An optoelectronic coupling device as claim in claim 1 further including the second end of the molded waveguide having at least one core region of the plurality of core regions exposed and having an optical device mounted thereon with a working portion of the optical device aligned to the exposed one core region of the plurality of core region of the waveguide.

4. An optoelectronic coupling device as claimed in claim 3 wherein the optical device is an optical transmitter.

5. An optoelectronic coupling device as claimed in claim 3 wherein the optical device is an optical receiver.

6. An optoelectronic coupling device as claimed in claim 1 wherein the cladding region includes an upper portion and a lower portion.

7. An optoelectronic module comprising:

an interconnect board having electronic components mounted thereon with interconnecting points;

an optical waveguide having a plurality of core regions surrounded by a cladding region, the optical waveguide having a first end, a second end, and a first surface, the first surface of the waveguide being mounted to the interconnect board securing the waveguide to the interconnect board, the first end having an opening that exposes a cross-section of a core region in the optical waveguide, an optical device mounted on the second end of the optical waveguide and having a working portion of the optical device aligned to at least one cross-section of the plurality of core regions in the optical waveguide; and an optical cable having a first end and a second end with the first end of the optical cable having a plurality of individual optical fibers each of which includes a core region, the individual optical fibers connected to the first end of the molded waveguide such that the core region of at least one of the individual fibers is aligned to the exposed cross-section of the core region of the waveguide.

8. An optoelectronic module as claimed in claim 7 further including the second end of the an optical cable being an optical connector.

9. An optoelectronic module as claim in claim 7 further including a wire bond that interconnects the interconnect board to the optical device, thereby electrically connecting the optical device with the interconnect board.

10. An optoelectronic module as claimed in claim 9 wherein the optical device is an optical transmitter.

11. An optoelectronic module as claimed in claim 9 wherein the optical device is an optical receiver.

12. An optoelectronic module as claimed in claim 7 wherein the cladding region includes an upper portion and a lower portion.

13. An optoelectronic coupling device comprising:
a molded optical waveguide having a plurality of core regions surrounded by a cladding region, the waveguide having a first end and a second end, the first end of the molded waveguide having a cavity with a bottom that exposes a cross-sectional surface of a core region of the plurality of core regions, the second end of the waveguide having exposed cross-sections of the plurality of core regions;

an optical device mounted onto the second end of the waveguide having a working portion of the optical device aligned with the exposed cross-section of an individual core region; and an optical cable having a first end and a second end with the first end of the optical cable having a plurality of individual optical fibers each of which includes a core region, the individual optical fibers inserted into the cavity of the first end of the molded waveguide such that the core region of at least one of the individual optical fibers is aligned to the exposed cross-sectional surface of a core region of the plurality of core regions of the waveguide.

14. An optoelectronic coupling device as claimed in claim 13 wherein the cavity of the molded optical waveguide is proportionally shaped to the optical cable, thereby facilitating connection of the optical cable to the optical waveguide so as to align individual optical fibers to at least one of the core regions of the plurality of core regions of the waveguide.

15. An optoelectronic coupling device as claimed in claim 13 wherein the cavity of the molded optical waveguide is proportionally shaped to the individual optical fibers, thereby facilitating connection of the individual optical fibers to at least one of the core regions of the plurality of core region of the waveguide.

16. An optoelectronic coupling device as claimed in claim 13 further including an optoelectronic device mounted on the second end of the waveguide.

17. An optoelectronic coupling device as claimed in claim 13 wherein the cladding region includes an upper portion and a lower portion.

18. A method for making an optoelectronic device comprising the steps of:
molding an optical waveguide having a plurality of core regions surrounded by a cladding region, the optical waveguide having a first end and a second end, the first end of the optical waveguide having a cavity with a bottom that exposes a cross-sectional surface of a core region of the plurality of core regions;

mounting an optical device on the second end of the optical waveguide and having a working portion of the optical device aligned with the exposed cross-sectional surface of the core region of the plurality of core regions;

providing an optical cable having a first end and a second end with the first end of the optical cable having a plurality of individual optical fibers each of which includes a core region;

attaching the optical cable with the individual optical fibers each having a first end positioned in the cavity and connected to the first end of the molded optical waveguide such that the core region of at least one of the individual optical fibers is aligned to the exposed cross-sectional surface of the core region of the plurality of core regions of the waveguide.

19. A method for making an optoelectronic device as claimed in claim 18 wherein the step of attaching the optical cable includes connecting the individual optical fibers to the first end of the molded optical waveguide by an optical adhesive.

* * * * *